US011602805B2

(12) United States Patent
Hötger et al.

(10) Patent No.: US 11,602,805 B2
(45) Date of Patent: Mar. 14, 2023

(54) COATING REMOVAL DEVICES AND METHODS FOR REMOVING COATINGS FROM SHEETS OF GLASS, PREFERABLY LAMINATED SHEETS OF GLASS

(71) Applicant: HEGLA boraident GmbH & Co. KG, Beverungen (DE)

(72) Inventors: Bernhard Hötger, Lauenförde (DE); Thomas Rainer, Wernigerode (DE)

(73) Assignee: HEGLA boraident GmbH & Co. KG, Beverungen (DE)

( * ) Notice: Subject to any disclaimer, the term of this patent is extended or adjusted under 35 U.S.C. 154(b) by 0 days.

(21) Appl. No.: 17/041,973

(22) PCT Filed: Feb. 28, 2019

(86) PCT No.: PCT/EP2019/054966
§ 371 (c)(1),
(2) Date: Sep. 25, 2020

(87) PCT Pub. No.: WO2019/185279
PCT Pub. Date: Oct. 3, 2019

(65) Prior Publication Data
US 2021/0086307 A1 Mar. 25, 2021

(30) Foreign Application Priority Data

Mar. 29, 2018 (DE) .......................... 102018107697.5

(51) Int. Cl.
*B23K 26/00* (2014.01)
*B23K 26/38* (2014.01)
(Continued)

(52) U.S. Cl.
CPC ................ *B23K 26/38* (2013.01); *B24B 7/19* (2013.01); *C03C 17/002* (2013.01); *C03C 2218/328* (2013.01); *C03C 2218/355* (2013.01)

(58) Field of Classification Search
CPC . B23K 26/38; C03C 17/002; C03C 2218/328; C03C 2218/355
See application file for complete search history.

(56) References Cited

U.S. PATENT DOCUMENTS 4,893,900 A * 1/1990 Robusto .............. H01S 3/08063
385/15
6,066,830 A * 5/2000 Cline ................... B23K 26/073
219/121.69
(Continued)

FOREIGN PATENT DOCUMENTS

CN 204280630 U * 4/2015
DE 3403682 C1 8/1985
(Continued)

OTHER PUBLICATIONS

PCT Application No. PCT/EP2019/054966 translation of International Search Report dated Jul. 9, 2019 (3 pages).
(Continued)

*Primary Examiner* — Nathan H Empie
(74) *Attorney, Agent, or Firm* — Greer, Burns & Crain, Ltd.

(57) ABSTRACT

A decoating method for the edge decoating of glass sheets, the glass sheets having at least on one of their two glass surfaces a protective coating in the form of a peel-off protective film or in the form of a polymer protective layer that cannot be peeled off, and preferably having a functional coating situated under the protective coating,
the protective film being partially mechanically removed, in particular ground away, for the edge decoating, in the form of at least one film strip, laser traces being introduced into the protective film before the mechanical removal of the film strip, and the laser traces being introduced in such a way that the film strip is removed in the form of individual film strip partial pieces separated from one another by the laser traces; or
the polymer protective layer being removed using laser radiation.

17 Claims, 4 Drawing Sheets

(51) Int. Cl.
*B24B 7/19* (2006.01)
*C03C 17/00* (2006.01)

(56) References Cited

U.S. PATENT DOCUMENTS

| | | | |
|---|---|---|---|
| 8,168,514 B2 | 5/2012 | Garner et al. | |
| 9,550,344 B2 | 1/2017 | Becker et al. | |
| 2004/0123627 A1* | 7/2004 | Larsen | C03C 23/0025 65/56 |
| 2012/0200812 A1* | 8/2012 | Qi | B23K 26/38 349/106 |
| 2013/0140291 A1 | 6/2013 | Zhuang et al. | |
| 2016/0062127 A1* | 3/2016 | Gittler | G01J 1/0271 359/894 |

FOREIGN PATENT DOCUMENTS

| | | |
|---|---|---|
| DE | 4118241 C2 | 10/1993 |
| DE | 19632240 A1 | 11/1997 |
| DE | 102007015767 A1 | 10/2008 |
| DE | 102008041278 A1 | 2/2010 |
| DE | 102010012265 A1 | 11/2011 |
| DE | 102011103589 A1 | 12/2012 |
| DE | 202013104834 U1 | 11/2013 |
| EP | 0517176 A1 | 12/1992 |
| EP | 1864950 A1 | 12/2007 |
| EP | 2279983 A2 | 2/2011 |
| EP | 3034478 A1 | 6/2016 |
| WO | 2012163506 A1 | 12/2012 |
| WO | 2016096435 A1 | 6/2016 |
| WO | 2017062423 A1 | 4/2017 |

OTHER PUBLICATIONS

PCT Application No. PCT/EP2019/054966 International Preliminary Report on Patentability dated Sep. 29, 2020 (8 pages).

PCT Application No. PCT/EP2019/054966 translation of International Preliminary Report on Patentability dated Sep. 29, 2020 (6 pages).

DE 10 2018 107 697.5: Office Action dated Oct. 23, 2018 and Statement of Relevance (11 pages).

DE 10 2018 010 277.8: Office Action dated Aug. 17, 2020 and Statement of Relevance (13 pages).

* cited by examiner

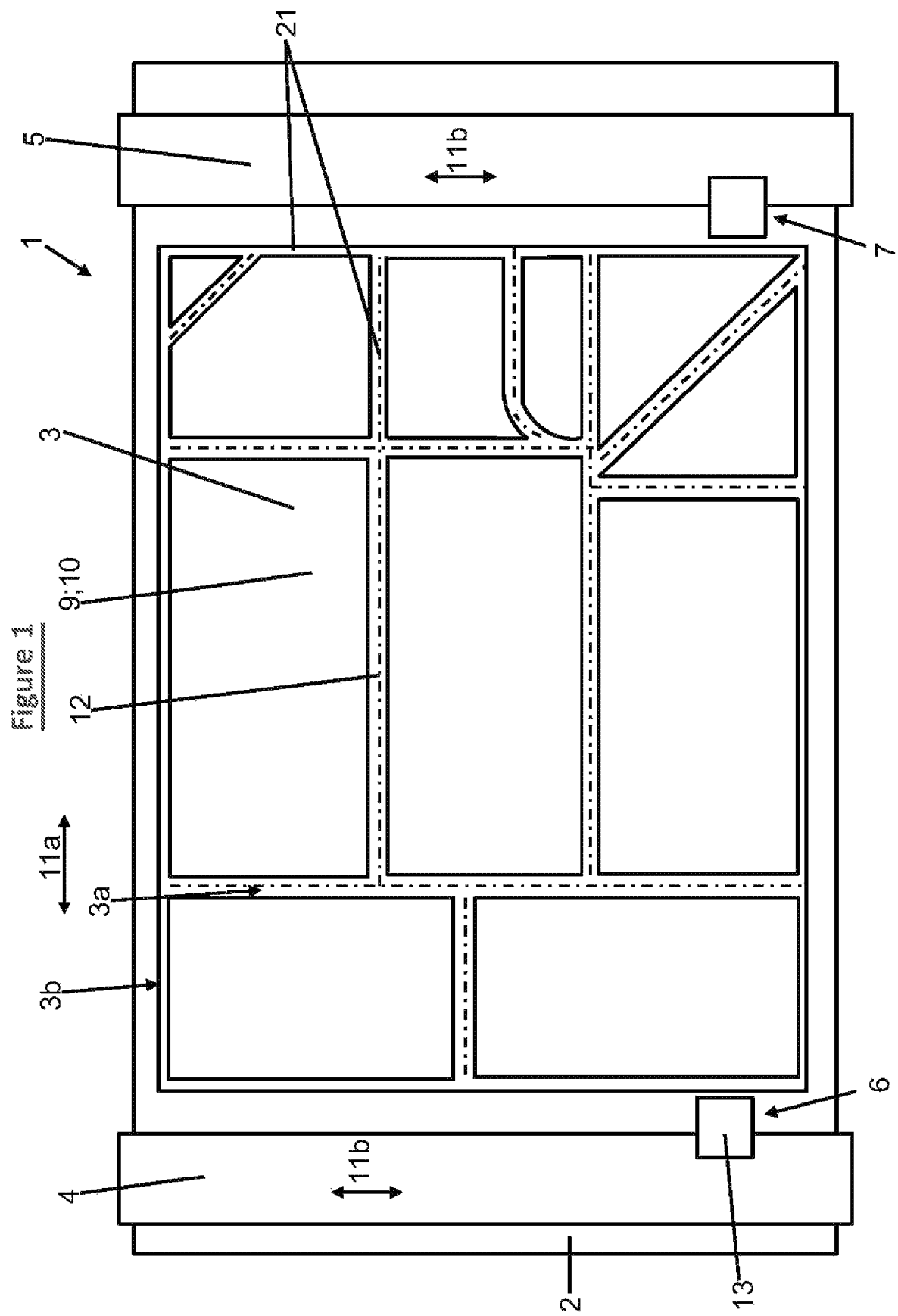

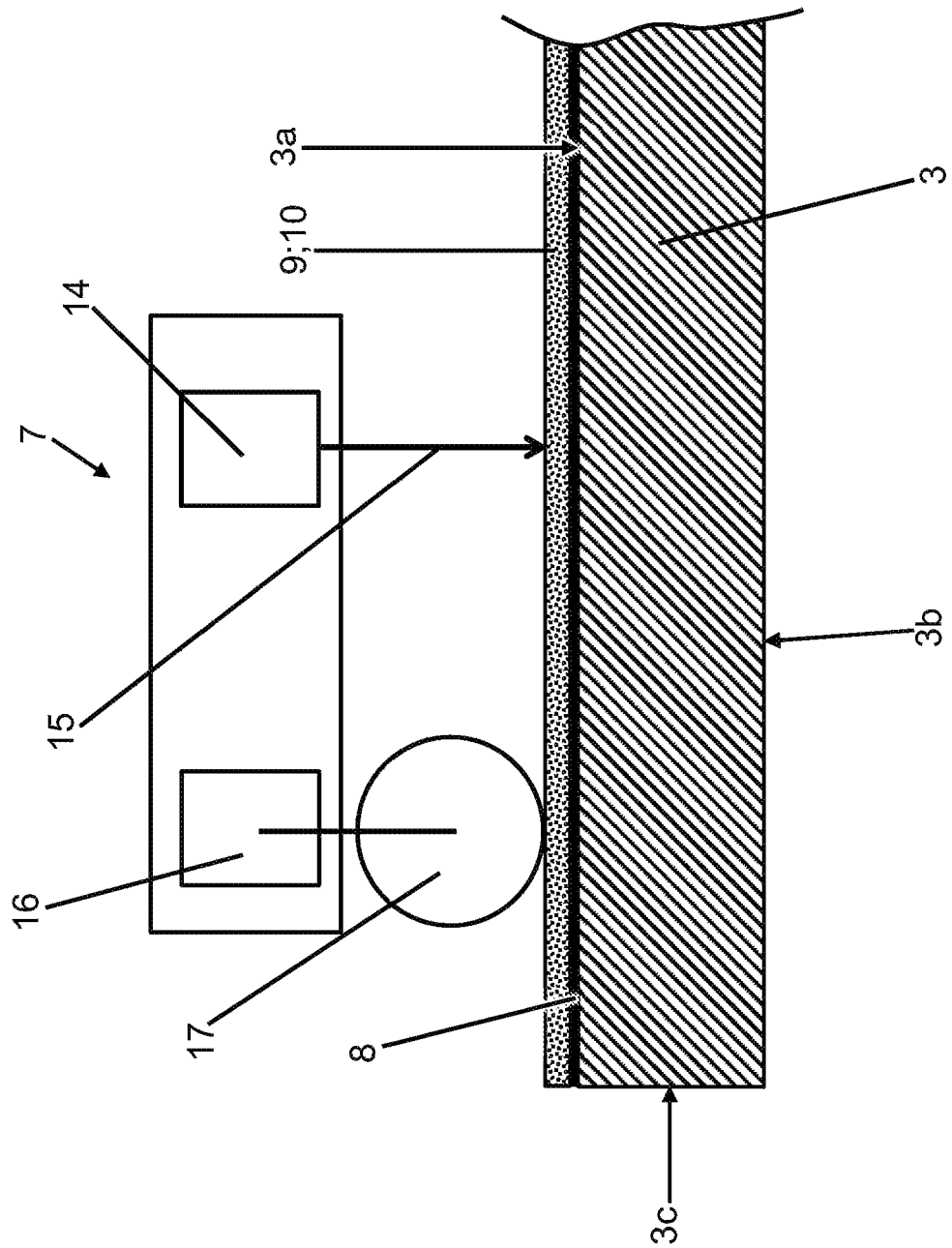

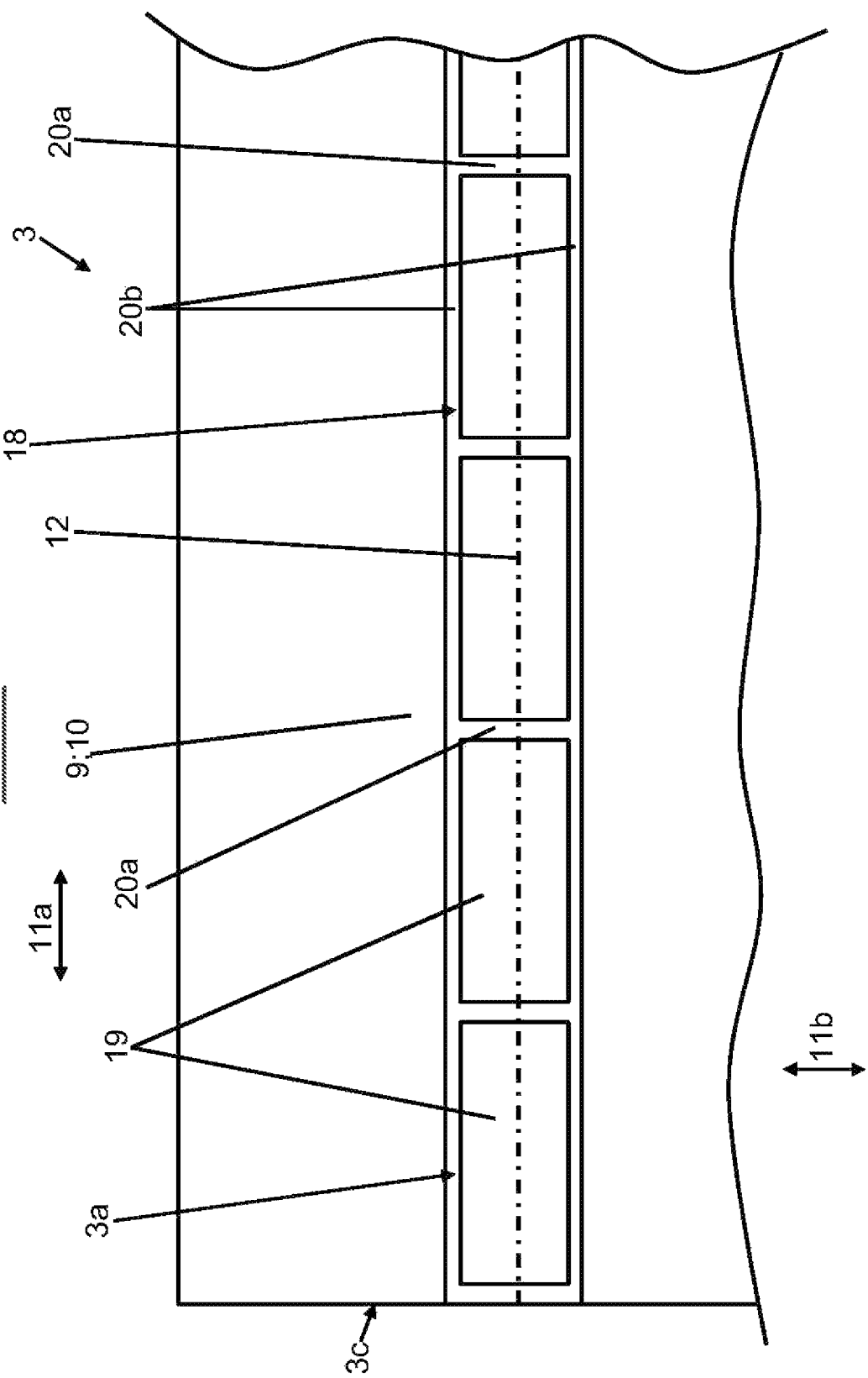

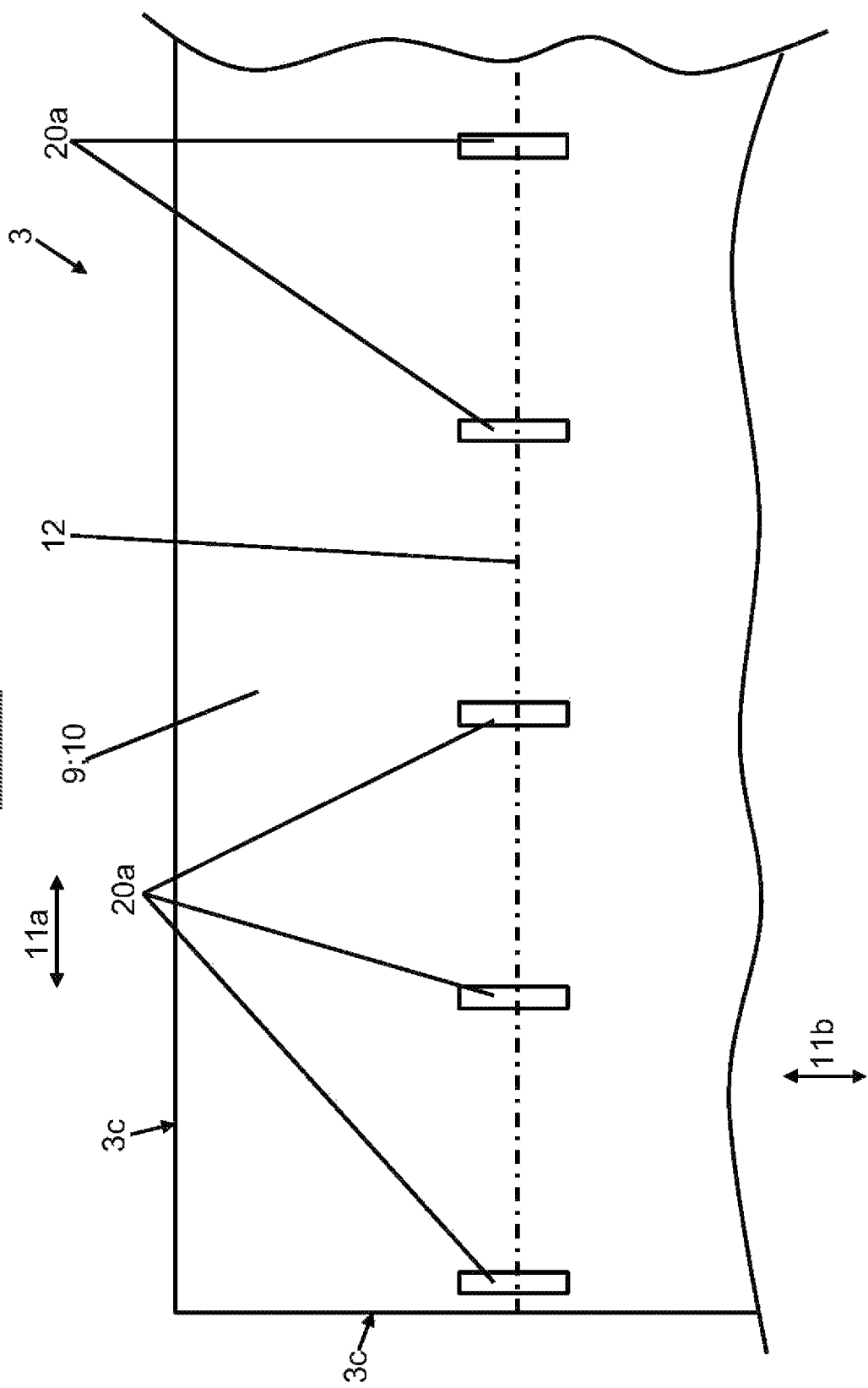

COATING REMOVAL DEVICES AND METHODS FOR REMOVING COATINGS FROM SHEETS OF GLASS, PREFERABLY LAMINATED SHEETS OF GLASS

RELATED APPLICATIONS

This application is a U.S. National Phase under 35 U.S.C. § 371 of International Application No. PCT/EP2019/054966, filed Feb. 28, 2019, which claims priority to German Patent Application No. 10 2018 107 697.5, filed Mar. 29, 2018, the entireties of which are hereby incorporated by reference.

The present invention relates to decoating devices and decoating methods for the edge decoating of glass sheets, preferably of laminated glass sheets.

All glass in the form of plates or sheets is referred to as flat glass, regardless of the production method used. In order to impart filtering, mirroring, heating, or other functions to flat glass sheets, a wide variety of one-layer or multilayer functional coatings are applied to the flat glass sheets. These functions may be, for example, heat protection, sun protection, or heating. The individual functional layers are usually metallic layers. For example, these are low-emission layers or electrical heating layers. One or more dielectric (functional) layers, for example made of an oxide such as aluminum oxide, may be situated between the individual metallic functional layers of a functional coating.

The individual functional layers are preferably applied on flat glass raw sheets having the maximum commercially standard size (6100 mm×3250 mm). From these large coated flat glass raw sheets, individual plates are then cut as needed and are then further processed to form functional units. These functional units may be for example insulating glass units, in which the plate edges of the individual plates are glued to, for example, spacer devices. For this edge bond, edge bond adhesives are used, the edge bond adhesives being designed exclusively for direct bonding with glass surfaces, and not with the functional layers. Therefore, the flat glass raw sheets must be decoated in the area of the adhesive, where the width of the decoating is for example approximately 10 mm. Without decoating, a reliable adhesion of the edge bond adhesive is not ensured. This process is referred to as edge decoating.

Edge decoating takes place along the glass sheet edges, and/or along later cutting or scoring or separating lines along which the flat glass raw sheets are broken into individual glass sheets after the decoating.

Generally, the functional coating is a single functional layer or a layer construction having a plurality of functional layers, having an overall thickness <2 µm. The layer construction is usually obtained through deposition processes.

In the case of glass sheets already cut to their final dimensions, the edge decoating takes place for example along the glass sheet edges, in a single decoating width.

In the case of glass raw sheets, decoating takes place in double decoating width, along both sides of the later cutting or scoring or separating line. However, here as well—given corresponding dimensions of the glass sheet and quality of the glass sheet edges—decoating can take place along the glass sheet edges in the single decoating width. In the region of the later cutting or scoring or separating lines, the decoating traces that are produced are thus twice as wide as in the region of the glass sheet edges. However, in the decoating of the edges it is disadvantageous that, through the going over of the sharp edges with decoating tools, these tools may be subject to strong and asymmetrical wear.

The removal of the functional layers is done in the technical field for example by mechanical removal using grinding tools, or by sandblasting. However, it may also be done using gas burners.

From DE 41 18 241 C2, it is known, for example, to use grinding devices for the decoating. Here, the coating is ground away from the glass raw sheet along cutting lines T. The cutting is subsequently carried out in the longitudinal center of the decoating trace thus obtained. The cutting contour formed by the cutting lines is bounded by edge cuts and null cuts R, these edge cuts and null cuts being at a distance from the outer edges of the flat glass raw sheets.

From DE 34 03 682, a method and a device are known in which the decoating and cutting process are combined, the decoating being done using gas burners.

German utility model DE 20 2013 104 834 U1 relates to a table for processing non-metallic transparent materials using laser radiation, in particular for removing metallic coatings, for example low-emission coatings, and other coatings from glass.

EP 1 864 950 A1, WO 2016/096435 A1, and DE 10 2007 015 767 A1 each also disclose the decoating of glass substrates (flat glass, solar cells) using a laser. The material to be removed is in each case the functional layer.

In addition, for some time there have been types of glass in which the functional coating, or also only the uncoated glass surface (in glass sheets without functional coating), is protected by a peel-off protective film (TPF, temporary protective film) or a polymer protective layer (e.g. Easy-Pro® of St. Gobain), in order to protect it from possible mechanical damage. The polymer protective layer is applied for example by spraying on and cannot be peeled off, but rather is fixedly bonded to the respective surface. However, during tempering in an oven it burns off easily and without leaving a residue.

For the further processing of the glass sheets, e.g. the production of insulating glass, analogous to the functional layers the protective film or the polymer protective layer must of course also be removed at least at the later edge regions. The removal of the protective film or polymer protective layer is currently done mechanically using a grinding tool, in particular a grinding wheel. If the glass sheet has a functional coating, the protective film or polymer protective layer and the functional coating are ground away in one working step.

However, this is not unproblematic, because in the mechanical grinding away of the polymer protective layer a large quantity of dust arises that then contaminates the equipment and damages components, and can also present a health risk. In the grinding away of the protective film, this film rolls up at higher advance speeds, so that long strips result that then clog the suction apparatus, or that partly remain on the glass. Moreover, the advance speed in both applications is significantly (approximately 5-10×) slower than in pure edge decoating, i.e. in the removal of the functional layers.

In a method commercially available from the company Macotec, first the protective film is cut using a double knife, and is then removed by suction, and in a second step the functional layers are removed. The removal of the functional layer(s) is done mechanically by grinding.

The object of the present invention is therefore the provision of edge decoating methods for removing the protective film or the polymer protective layer from glass sheets, preferably from laminated glass sheets, in which the decoating is to be done easily, quickly, reliably, and at low cost.

A further object of the present invention is the provision of a decoating device for carrying out the respective decoating method.

These objects are achieved by a decoating method according to claim 1, a decoating method according to claim 13, and a decoating device according to claim 17 and a decoating device according to claim 18. Advantageous further developments of the present invention are characterized in the subsequent subclaims.

In the following, the present invention is explained exemplarily in more detail on the basis of a drawing.

FIG. 1 shows, schematically and in highly simplified fashion, a top view of a cutting and decoating station having a decoating device according to the present invention, with a decoated glass sheet;

FIG. 2 shows, schematically and in highly simplified fashion, a section through a glass sheet together with a decoating device according to the present invention situated above it;

FIG. 3 shows, schematically and in highly simplified fashion, a top view of a glass sheet having film strip partial pieces before the grinding away;

FIG. 4 shows, schematically and in highly simplified fashion, a top view of a glass sheet before the grinding away, according to a further variant of the decoating method according to the present invention.

A cutting and decoating station 1 (FIG. 1) preferably has a support table 2 for supporting a glass sheet 3, a first movable bridge 4, a second movable bridge 5, a cutting device 6, and a decoating device 7 according to the present invention.

Glass sheet 3 (FIG. 2) has a first and second glass sheet surface 3a;b as well as a peripheral glass sheet edge 3c. Glass sheet 3 can be for example a single glass plate (FIG. 2) or a laminated glass sheet made up of a plurality of glass plates bonded to one another. In addition, it is preferably a glass raw sheet. However, it can also be a cut glass sheet.

In addition, glass sheet 3 has a surface functional coating 8 on at least one of its two glass surfaces 3a;b. Functional coating 8 can have one or more individual functional layers. In the case of a plurality of functional layers, it is thus a functional layer laminate. The functional layers change particular properties of glass sheet 3, or impart particular functions to it. The functions may be for example heat protection, sun protection, or heating. The individual functional layers are preferably metallic layers, e.g. low-emission layers.

Functional coating 8 preferably has a thickness of <1 μm.

In addition, glass sheet 3 has on at least one of its two glass surfaces 3a;b a protective coating 9 in the form of a peel-off protective film 10 or a polymer protective layer. Protective coating 9 outwardly covers the respective glass surface 3a;b, and protects functional coating 8 situated under it, or, if no functional coating 8 is present, protects the uncoated glass surface 3a;b, from mechanical damage. Protective coating 9 thus forms the outer, or external, layer of glass sheet 3.

In contrast to functional coating 8, protective coating 9 is completely removed before the final application of the glass sheet 3. It is thus not permanently present. Protective film 10 is peeled off, and the polymer protective layer is burnt. A functional coating 8, in contrast, is present permanently at least in some regions.

Protective film 10 is preferably made of plastic, preferably polyvinyl chloride (PVC), and can be peeled off from glass sheet surface 3a;b.

In addition, protective film 10 preferably has a thickness of from 20 to 100 μm.

The polymer protective layer is made of a polymer and cannot be peeled off from glass sheet surface 3a;b. The polymer protective layer is fixedly bonded to the respective surface (functional coating 8 or glass sheet surface 3a;b).

In addition, the polymer protective layer preferably has a thickness of from 2 to 14 mm, preferably 4 to 12 mm.

The two movable bridges 4;5 extend over support table 2 at the top and/or at the bottom, and can each be moved back and forth over glass sheet 3 in a first direction of travel 11a. For this purpose, corresponding drive means are provided. First direction of travel 11a is parallel to a glass sheet plane, or to the two glass sheet surfaces 3a;b.

The cutting device 6 serves, in a known manner, for the cutting or scoring of glass sheet surface(s) 3a;b along specified scoring or separating lines 12. If glass sheet 3 is a single glass plate, only one of the two glass sheet surface(s) 3a;b is scored. For this purpose, cutting device 6 has, in a known manner, a cutting head 13 having a scoring tool, preferably a cutting wheel. Cutting head 13 is mounted, in a known manner, on first movable bridge 4 so as to be movable in a second direction of travel 11b. Corresponding drive means are provided for this purpose. Second direction of travel 11b is perpendicular to first direction of travel 11a, and is parallel to a glass sheet plane, or to the two glass sheet surfaces 3a;b. The cutting wheel can be rotated freely or driven rotationally about a horizontal axis of rotation that is parallel to the glass sheet plane or to the two glass sheet surfaces 3a;b. In addition, the cutting wheel can be rotated freely or driven rotationally about a vertical axis of rotation that is perpendicular to the glass sheet plane or to the two glass sheet surfaces 3a;b. In this way, any desired cut contours can be produced in a known manner.

In the case of a glass sheet laminate, the two glass sheet surface(s) 3a;b are scored in a known manner, preferably simultaneously. Glass sheet 3 is then thus scored on its upper side and on its lower side, preferably simultaneously. For this purpose, two cutting heads 13 located one over the other are provided.

Decoating device 7 according to the present invention is used to remove protective coating 9 and to remove the functional coating 8 situated under it. For this purpose, it has a laser beam-producing device 14 for producing a laser beam 15, and a grinding head 16. In addition, decoating device 7 is mounted on second movable bridge 5 so as to be movable in second direction of travel 11b. Corresponding drive means are provided for this purpose.

Laser beam-producing device 14 is used for the cutting of protective film 10, or for removing the polymer protective layer, as is described in more detail below. For this purpose, laser beam-producing device 14 produces laser beam 15, directed onto glass surface 3a. For this purpose, laser beam-producing device 14 has a laser radiation source and an associated optical system. Laser beam 15 can be pivoted or diverted from an initial position in which it is oriented vertically.

The laser beam source preferably produces a laser beam 15 whose wavelength is in the infrared range. Preferably, the wavelength of laser beam 15 is from 1 to 19 μm, preferably 9 to 11 μm.

In addition, the laser radiation source preferably produces a laser beam 15 whose laser power is <200 W, preferably <100 W, and/or ≥5 W, preferably ≥10 W.

Grinding head 16 serves for removing the incised protective film 10 and/or to remove the functional coating, as is explained in more detail below. For this purpose, grinding head 16 has, in a known manner, at least one grinding tool, preferably at least one grinding wheel 17.

Grinding wheel 17 is freely rotatable or capable of being rotationally driven about a horizontal axis of rotation that is parallel to the glass sheet plane, or to the two glass sheet surfaces 3$a;b$. In addition, grinding wheel 17 is freely rotatable or rotationally drivable about a vertical axis of rotation that is perpendicular to the glass sheet plane or to the two glass sheet surfaces 3$a;b$. In this way, in combination with the movement of coating removal device 7 along second movable bridge 5, any desired coating removal contours can be produced in a known manner.

According to a preferred embodiment, grinding head 16 has two grinding wheels (not shown) in accordance with DE 196 322 40 A1. In this case, the first grinding wheel has the thickness of a single decoating width, and the second grinding wheel has the thickness of a double decoating width.

In the following, the decoating method according to the present invention is explained in more detail. First, the decoating of a glass sheet 3 having a protective film 10 as protective coating 9 is explained:

For the edge deletion, inside sheet of glass 3 the regions at both sides along the later separating lines or scoring lines 12, which have yet to be made, are decoated. For this purpose, according to the present invention first a film strip 18, which is to be removed, of protective film 10 is cut out from protective film 10 by laser beam 15, and is simultaneously separated into individual film strip partial pieces 19 (FIG. 3). The individual film strip partial pieces 19 remain adhesively bonded to glass sheet 3. That is, along the later separating or scoring lines 12, or seen in a longitudinal direction of film strip 18 that is to be removed, a plurality of film strip partial pieces 19 situated one after the other are present that are not connected to one another, and each of which adheres on glass sheet 3.

The cutting out of film strip 18 and of film strip partial pieces 19 is done by introducing burn traces or laser traces 20$a;b$ into protective film 10. In the region of laser traces 20$a;b$, protective film 10 is completely removed, in particular vaporized or burnt. Laser traces 20$a;b$ surround film strip partial pieces 19. They thus form the outline or the contour of film strip partial pieces 19.

The movement of laser beam 15 takes place using the optical system of laser beam-producing device 14 and through the movement of decoating device 7 along movable bridge 5 and the movement of movable bridge 5. This is because the optical system of laser-producing device 14 is capable of moving laser beam 15 in an area of e.g. 100 mm×100 mm (scanning field), using two adjustable mirrors (scanning optical system).

After the cutting out of film strip 18 and separation into the individual film strip partial pieces 19, these are ground away in a known manner using grinding wheel 17. At the same time, functional coating 8 is also ground away. In order to enable the grinding away of the desired contours, grinding head 13, together with grinding wheel 17, is moved along second movable bridge 5 in second direction of travel 11$b$, in a known manner. In addition, second movable bridge 5 is moved in first direction of travel 11$a$. And grinding wheel 17 is on the one hand rotated about its wheel axis of rotation and, if necessary, is pivoted about its vertical axis.

After the grinding, glass sheet 3 has decoating traces 21 on the processed glass sheet surface 3$a$. Decoating traces 21 each extend alongside each later scoring or separating line 12 and at both sides of it. In particular, scoring or separating line 12 is situated centrically within decoating trace 21. Thus, the glass sheet is decoated in double decoating width, at both sides alongside later scoring or separating line 12.

Along glass sheet edges 3$c$, the decoating—in case of corresponding final dimensions of glass sheet 3 and adequate quality of glass sheet edges 3$c$—preferably takes place in a single decoating width. The same holds for glass sheets 3 cut to the final dimensions, in which a decoating takes place only along glass sheet edges 3$c$, but no longer takes place in the region within glass sheet edges 3$c$.

Due to the fact that film strip 18 to be removed was previously divided into the individual film strip partial pieces 19, during the grinding away protective film 10 does not roll up, even at higher advance speeds. The individual removed film strip partial pieces 19 can be easily suctioned away without the suction device becoming clogged, and without film residues remaining on glass sheet 3. Thus, a rapid, clean, and reliable decoating is ensured by the decoating method according to the present invention.

In the method described above, laser traces 20$a$ that are transverse, or perpendicular, to the longitudinal direction of film strip 18 that is to be removed, and laser traces 20$b$ that are parallel to the longitudinal direction of film strip 18 that is to be removed, are produced. As a result, film strip partial pieces 19 are cut out from protective film 10, or separated from the rest of protective film 10, already before the grinding away. Here, laser traces 20$a$ need not be perpendicular to the longitudinal direction of film strip 18 to be removed, but need merely be at an angle thereto. Laser traces 20$a;b$ also do not have to be rectilinear.

It is also within the scope of the present invention that, before the mechanical removal of film strip 18, only laser traces 20$a$ are introduced that are at an angle, in particular transverse or perpendicular, to the longitudinal direction of film strip 18 that is to be removed (FIG. 4). "At an angle" thus means that laser traces 20$a$ deviate at a particular angle from the longitudinal direction of film strip 18 that is to be removed.

What is essential is only that laser traces 20$a$ be introduced in such a way that film strip 18 is removed in the form of individual film strip partial pieces 19 separated from one another by laser traces 20$a$.

In addition, it is also possible for laser traces 20$a;b$ to be produced not as completely solid lines—i.e., protective film 10 is not completely removed in the region of laser traces 20$a,b$; rather, protective film 10 is only perforated in the region of laser traces 20$a;b$. In the perforation, protective film 10 is provided with holes at preferably uniform spatial intervals.

After the decoating, separating or scoring lines 12 are then produced using cutting head 13, and glass sheet 3 is then broken into individual glass sheet cuts at the scoring or separating lines 12, in a known manner.

If glass sheet 3 has the polymer protective layer as protective coating 9, then according to the present invention the polymer protective layer is removed using laser beam 15. The movement of laser beam 15 takes place as described above.

Depending on the type of the functional coating 8, this coating can be removed after the removal of the polymer protective layer by laser beam 15. In this case, coating removal device 7 does not have to have a grinding head 16. The removal of functional coating 8 by laser radiation then takes place with a correspondingly adapted wavelength and adapted energy input. A further laser beam-producing device could also be provided for this purpose.

Alternatively to this, functional coating 8 can be ground away as described above.

The advantage of removing the polymer protective layer using laser radiation is that the dust contamination is significantly less. Thus, the decoating method according to the present invention ensures a rapid, clean, and reliable decoating.

It is also within the scope of the present invention that cutting device 6 be separate from decoating device 7, i.e. situated in a different station.

Moreover, grinding head 16 and laser beam-producing device 14 can also be decoupled from one another. That is, they can be movable separately from one another and/or can also be fastened to different movable bridges.

In addition, the creation of the contours can also be achieved in that decoating device 7 is movable on a stationary bridge and the glass sheet is moved during the coating removal process. What is essential is only that decoating device 7, together with grinding wheel 17 and/or laser beam 15, and glass sheet 3 carry out corresponding movements relative to one another. The same holds for the cutting process.

In addition, it is of course also within the scope of the present invention that only a single traveling bridge be provided, and that the cutting device and the decoating device be situated on the same traveling bridge. However, grinding head 16 and laser beam-producing device 14 may also be situated on different traveling bridges.

In addition, if the glass sheets have, on both glass sheet surfaces, a polymer coating or a protective film, and if applicable a functional coating, then the decoating takes place either simultaneously for the two glass sheet surfaces or one after the other.

The removal of the polymer protective layer using laser radiation was not immediately obvious here, because the polymer protective layer is much thicker than functional layers. In addition, it was not to be expected that a laser decoating would be successful. This is because the polymer protective layer was developed in order to protect functional layers, and to burn off in an oven in a process lasting at least two minutes at 600 to 700° C. without leaving a residue. In contrast, the duration of action of the laser radiation is in the millisecond range. In addition, damage to the glass surface by the laser radiation is to be avoided. A combination of suitable wavelength and energy input has resulted in a removal of the polymer protective layer wherein functional layers and the glass surface remain unmodified.

The invention claimed is:

1. A decoating method for the edge decoating of a glass sheet, the glass sheet having two glass surfaces and having on at least one of the two glass surfaces a protective coating in the form of a peel-off protective film, the glass sheet to be divided into a plurality of glass plates along at least one projected cutting or scoring line extending in a first direction, the method comprising:
    introducing first laser traces into the protective film, at least two of the first laser traces extending parallel to each other in the first direction, the at least two first laser traces being positioned about the projected cutting or scoring line such that a first one of the at least two first laser traces is positioned on a first side of the projected cutting or scoring line and a second one of the at least two first laser traces is positioned on a second side of the projected cutting or scoring line, the at least two first laser traces defining therebetween a film strip to be removed;
    introducing to the film strip a plurality of angled laser traces extending in a second direction at an angle to the first direction, the plurality of angled laser traces dividing the film strip to be removed into a plurality of partial pieces separated from one another;
    after introducing the first and angled laser traces, mechanically removing the plurality of partial pieces of protective film separated from one another from the glass sheet.

2. The decoating method according to claim 1, wherein the angled laser traces are introduced perpendicular to the first direction.

3. The decoating method according to claim 1, wherein the protective film is completely removed in the region of the angled laser traces.

4. The decoating method according to claim 3, wherein the protective film is vaporized or burnt in the region of the angled laser traces.

5. The decoating method according to claim 1, wherein the protective film is perforated in the region of the angled laser traces, using laser radiation.

6. The decoating method according to claim 1, wherein the angled laser traces are introduced in such a way that they are situated one after the other, seen in the first direction.

7. The decoating method according to claim 1, wherein the film strip partial pieces are cut out in such a way that they continue to adhere to the glass sheet.

8. The decoating method according to claim 1, wherein the film strip partial pieces are cut out by introducing the angled laser traces into the protective film, and the first and angled laser traces surround the film strip partial pieces.

9. The decoating method according to claim 1, wherein the glass sheet has a functional coating situated under the protective coating, and the functional coating is simultaneously also removed during the mechanical removal of the film strip partial pieces.

10. The decoating method according to claim 9, wherein the functional coating is removed during grinding away the film strip partial pieces.

11. The decoating method according to claim 1, wherein the removed film strip partial pieces are suctioned away.

12. The decoating method according to claim 1, wherein in order to produce the laser traces, a laser beam is used having a wavelength in the infrared range.

13. The decoating method according to claim 12, wherein the laser beam has a wavelength from 1.0 to 12 µm.

14. The decoating method according to claim 1, wherein for the production of the first and angled laser traces, a laser beam is used having at least one of the following properties:
    a laser power <200 W,
    or a laser power of ≥5 W.

15. The decoating method according to claim 1, wherein the glass sheet to be decoated has a functional coating situated under the peel-off protective film.

16. The decoating method according to claim 1, wherein, for the edge decoating, the protective film is partially ground away.

17. The decoating method according to claim 1, wherein the film strip partial pieces are ground away.

* * * * *